United States Patent
Sundman et al.

(10) Patent No.: US 10,602,449 B2
(45) Date of Patent: Mar. 24, 2020

(54) METHODS AND STATIONS FOR POWER SAVING IN RADIO COMMUNICATION

(71) Applicant: TELEFONAKTIEBOLAGET LM ERICSSON (PUBL), Stockholm (SE)

(72) Inventors: Dennis Sundman, Solna (SE); Miguel Lopez, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 78 days.

(21) Appl. No.: 15/740,483

(22) PCT Filed: Jul. 1, 2015

(86) PCT No.: PCT/SE2015/050776
§ 371 (c)(1),
(2) Date: Dec. 28, 2017

(87) PCT Pub. No.: WO2017/003336
PCT Pub. Date: Jan. 5, 2017

(65) Prior Publication Data
US 2018/0199289 A1    Jul. 12, 2018

(51) Int. Cl.
*H04W 52/02* (2009.01)
*H04W 28/02* (2009.01)
(Continued)

(52) U.S. Cl.
CPC ....... *H04W 52/0235* (2013.01); *H04W 28/02* (2013.01); *H04W 28/0221* (2013.01);
(Continued)

(58) Field of Classification Search
None
See application file for complete search history.

(56) References Cited

U.S. PATENT DOCUMENTS

2009/0312073 A1    12/2009 Park et al.
2012/0163292 A1    6/2012 Kneckt et al.
(Continued)

FOREIGN PATENT DOCUMENTS

WO    2006115999 A2    11/2006

OTHER PUBLICATIONS

International Search Report and Written Opinion issued in Application No. PCT/SE2015/050776 dated Apr. 1, 2016, 11 pages.
(Continued)

*Primary Examiner* — Brian S Roberts
(74) *Attorney, Agent, or Firm* — Patent Portfolio Builders, PLLC

(57) ABSTRACT

Methods and stations (200, 204) for enabling power saving in a receiving station (204) when a transmitting station (200) transmits a radio signal to a targeted station (202). The transmitting station (200) sets at least one power limitation bit that indicates an estimated power limitation status of the targeted station (202), and transmits the radio signal with a preamble including the power limitation bit. When receiving said preamble, the receiving station (204) is able to determine whether to receive and decode the remaining complete radio signal or not, based on the power limitation bit. For example, if the receiving station (204) itself is power limited, it can save power by not receiving and decoding the complete radio signal when the power limitation bit in the preamble indicates that the targeted station (202) is non-power limited.

15 Claims, 5 Drawing Sheets

(51) Int. Cl.
*H04W 4/70* (2018.01)
*H04W 84/12* (2009.01)

(52) U.S. Cl.
CPC .......... *H04W 52/0206* (2013.01); *H04W 4/70* (2018.02); *H04W 84/12* (2013.01); *Y02D 70/21* (2018.01)

(56) References Cited

U.S. PATENT DOCUMENTS

| | | | | |
|---|---|---|---|---|
| 2013/0121243 A1* | 5/2013 | Vermani | ............... | H04L 1/0029 370/328 |
| 2013/0142095 A1* | 6/2013 | Calcev | .................. | H04W 28/02 370/311 |
| 2013/0235773 A1* | 9/2013 | Wang | ................ | H04W 52/0206 370/311 |

OTHER PUBLICATIONS

IEEE P802.11ah TM/D3.0 "Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Sub 1 GHz License Exempt Operation" Prepared by the 802.11 Working Group of the LAN/MAN Standards Comittee of the IEEE Computer Society, 2014, 611 pages.

A supplementary European Search Report issued in Application No. 15897284.4 dated Jun. 5, 2018, 4 pages.

\* cited by examiner

METHODS AND STATIONS FOR POWER SAVING IN RADIO COMMUNICATION

CROSS REFERENCE TO RELATED APPLICATION(S)

This application is a 35 U.S.C. § 371 National Stage of International Patent Application No. PCT/SE2015/050776, filed Jul. 1, 2015, designating the United States, the disclosure of which is incorporated by reference.

TECHNICAL FIELD

The present disclosure relates generally to a transmitting station, a receiving station and methods therein, for enabling power saving when the transmitting station transmits a radio signal to a targeted station. The receiving station may be more or less power limited such as a battery powered wireless device.

BACKGROUND

In networks of today for wireless radio communication, it is common to use a shared radio resource for communication of radio signals between various different nodes capable of radio communication such as access points, base stations, wireless devices, Machine-to machine (M2M) devices, relay stations, depending on the terminology used. In this description, the term "station" will be used to generally denote a node capable of radio communication. The shared radio resource may be defined by frequency, time and/or code which is well-known in this field. This means that when a radio signal, e.g. comprising a data packet, is transmitted by a transmitting station on the shared radio resource, this radio signal can be detected and received by any station located within "hearing" distance from the transmitting station and monitoring the shared radio resource. Any station that detects and receives the radio signal is therefore required to determine whether the transmitted radio signal is intended, i.e. targeted, to be received and used by that station or not.

FIG. 1 illustrates a typical communication scenario for such a procedure, involving a transmitting station 100 that transmits a radio signal, e.g. comprising a data packet, which is intended to be received and used by another station 102 which can thus be called the "targeted station". The transmitting station 100 may be any of the above-mentioned types of nodes. In this example, there are three other stations, generally indicated by numeral 104, which are located within an area where the transmitted radio signal can be "heard", i.e. detected and received. The stations 104 can therefore be called "receiving stations" and the targeted station 102 is effectively also a receiving station in this context.

It is thus assumed that the targeted station 102 and the other receiving stations 104 are able to receive the radio signal, e.g. as transmitted on a shared radio resource which is monitored by the stations 102, 104, but none of them knows initially to which station the signal is targeted until they have decoded the radio signal and read a destination identity or address in the signal which indicates station 102 as the intended receiver, i.e. target, of the radio signal. As a result, the targeted station 102 will proceed to use the received radio signal in some sense depending on its content, while the other stations 104 will simply discard or ignore the received radio signal since it was not directed to them. For example, the radio signal may contain data and/or signaling message directed to the targeted station 102 alone in this example. In other examples, a radio signal may be directed to more than one targeted station at the same time and throughout this description the term targeted station should be understood as at least one targeted station.

At least some of the receiving stations 102, 104 may be powered by a power source with limited capacity and lifetime such as a battery, which is common for handheld wireless devices and for M2M devices such as sensors, and such stations can be referred to as power limited stations. It is a problem that power is consumed in the receiving stations 104 for receiving and decoding the radio signal only to find out that it is directed to station 102. The received and decoded radio signal is thus useless to stations 104 and power has been consumed to no avail, only draining each stations' power source which may reduce its lifetime.

This problem can thus be significant for stations that are power limited and/or have requirements for a long battery lifetime, particularly when there are frequent transmissions of radio signals in the area and when the transmitted radio signals are of considerable length often having the target address or identity placed close to the end of the packet. In addition, a checksum for a data packet containing some payload is typically taken over the entire payload which must thus be decoded to confirm that the packet has been received correctly according to the checksum.

SUMMARY

It is an object of embodiments described herein to address at least some of the problems and issues outlined above. It is possible to achieve this object and others by using a transmitting station, a receiving station and methods therein as defined in the attached independent claims.

According to one aspect, a method is performed by a transmitting station for enabling power saving in one or more receiving stations when the transmitting station transmits a radio signal to a targeted station. In this method, the transmitting station estimates a power limitation status of the targeted station, and sets at least one power limitation bit that indicates the estimated power limitation status of the targeted station. the transmitting station then transmits the radio signal with a preamble including the at least one power limitation bit. Thereby, any receiving station that receives said preamble is enabled to determine whether to receive and decode the complete radio signal or not based on the at least one power limitation bit.

According to another aspect, a transmitting station is arranged to enable power saving in one or more receiving stations when the transmitting station transmits a radio signal to a targeted station. The transmitting station comprises a processor and a memory, said memory comprising instructions executable by said processor whereby the transmitting station is configured to:
  estimate a power limitation status of the targeted station,
  set at least one power limitation bit that indicates the estimated power limitation status of the targeted station, and
  transmit the radio signal with a preamble including the at least one power limitation bit.

Thereby, any receiving station that receives said preamble is enabled to determine whether to receive and decode the complete radio signal or not based on the at least one power limitation bit.

According to another aspect, a method is performed by a receiving station when a transmitting station transmits a radio signal to a targeted station. In this method the transmitting station receives a preamble of the radio signal, the preamble including at least one power limitation bit that indicates a power limitation status of the targeted station. The transmitting station then determines whether to receive and decode the complete radio signal or not based on the at least one power limitation bit.

According to another aspect, a receiving station comprises a processor and a memory, said memory comprising instructions executable by said processor whereby the receiving station is operative to:

receive a preamble of a radio signal transmitted by a transmitting station to a targeted station, the preamble including at least one power limitation bit that indicates a power limitation status of the targeted station, and determine whether to receive and decode the complete radio signal or not based on the at least one power limitation bit.

When employing any of the above methods and stations, it is an advantage that the receiving station can save power and processing time by not receiving and decoding the complete radio signal after the preamble when detecting that the radio signal is not intended for the receiving station based on the power limitation bit. This is an advantage particularly when the receiving station can "hear" many radio signals transmitted by various stations and when the signals are of considerable length.

The above transmitting station, receiving station and methods therein may be configured and implemented according to different optional embodiments to accomplish further features and benefits, to be described below.

A computer program is also provided comprising instructions which, when executed on at least one processor in either of the job scheduling node and the resource monitor, cause the at least one processor to carry out either of the methods described above for the transmitting station and the receiving station, respectively. A carrier is also provided which contains the above computer program, wherein the carrier is one of an electronic signal, optical signal, radio signal, or a non-tangible computer readable storage medium.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enabling power saving in a receiving station when a transmitting station transmits a radio signal to a targeted station. This can be accomplished as follows and with reference to the communication scenario depicted in FIG. 2 involving a transmitting station 200, a targeted station 202 and a number of receiving stations 204 of which three are shown as an example. When obtaining data or other information that is to be transmitted in the radio signal to the targeted station 202, the transmitting station 200 sets at least one power limitation bit that indicates an estimated power limitation status of the targeted station 202, and transmits the radio signal with a preamble including the power limitation bit(s) which may be a single bit or a combination of two or more bits. In particular, the power limitation bit or bits may have either a first value, e.g. 1 or 0, indicating that the targeted station 202 is power limited or a second value, e.g. 0 or 1, indicating that the targeted station 202 is non-power limited.

When receiving this preamble with a power limitation bit, as indicated by dashed arrows in the figure, the receiving station 204 is able to determine whether to receive and decode the remaining complete radio signal or not, based on the power limitation bit. The radio signal may e.g. comprise one or more data packets.

For example, if the receiving station 204 itself is power limited, it can save power by not receiving and decoding the complete radio signal when detecting that the power limitation bit indicates that the targeted station 202 is non-power limited which implies that the radio signal is not intended for the receiving station being power limited. In this case the receiving station 204 simply discards the radio signal after reading the power limitation bit in the preamble. Conversely, if the receiving station 204 itself is non-power limited, it can likewise discard the radio signal when the power limitation bit indicates a power limited targeted station.

Figure 1:
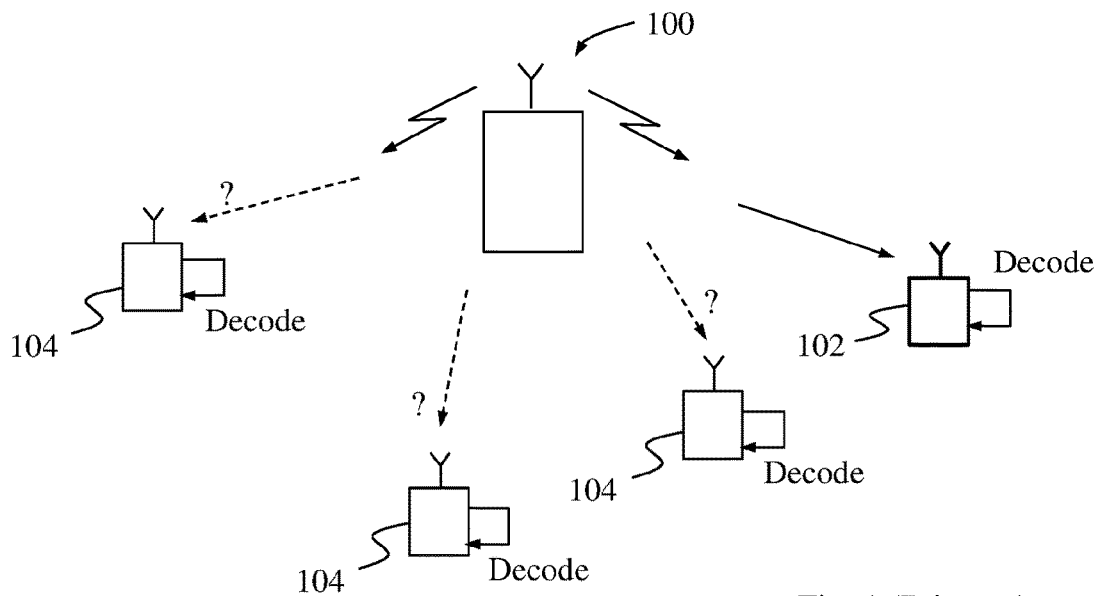
FIG. 1 is a communication scenario illustrating how a transmitted data packet is decoded by multiple receiving stations, according to the prior art.
Figure 2:
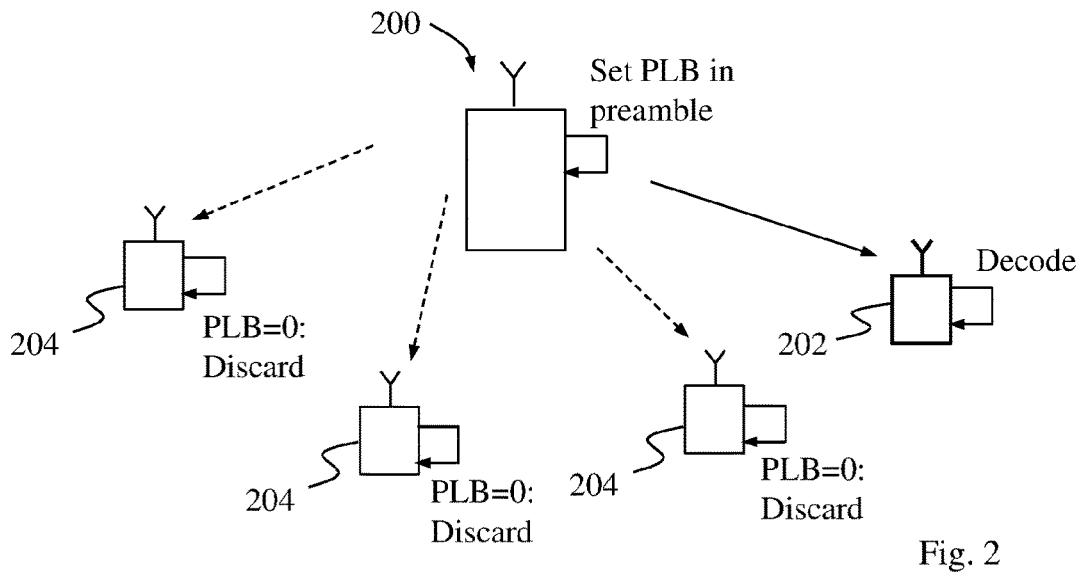
FIG. 2 is a communication scenario illustrating an example of how the solution may be employed when a radio signal is transmitted, according to some possible embodiments.

FIG. 2 illustrates that the power limitation bit "PLB" is 0 indicating a non-power limited targeted station 202 in this example, which means that the receiving station 204 can safely discard the radio signal when detecting the power limitation bit to be 0, itself being a power limited station. The solution may also be used such that a non-power limited receiving station is able to discard a radio signal and save power and processing capacity when the power limitation bit therein indicates a power limited targeted station. Instead of receiving and decoding the remainder of the radio signal, which may sometimes have a considerable length, the receiving station 204 can in either case enter sleep mode immediately after having detected the power limitation bit. Thus, the receiving station 204 will in this case not consume precious power, e.g. from a power source with limited capacity and lifetime such as a battery, by receiving and decoding the entire radio signal to no avail just to find out that the radio signal is intended for reception by another station, i.e. the targeted station 202.

Figure 2A:
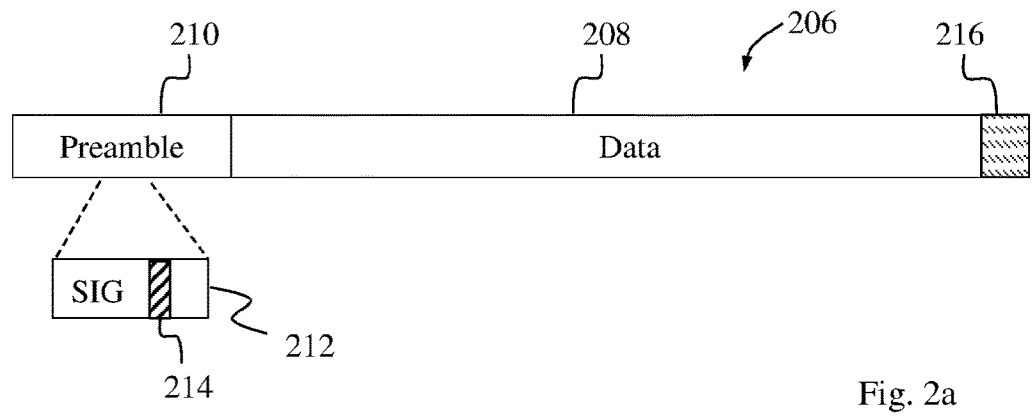
FIG. 2a is a diagram illustrating an example of how a power limitation bit can be included in a preamble of a radio signal, according to further possible embodiments.

FIG. 2a illustrates an example of how the power limitation bit can be included in a preamble of the radio signal 206 transmitted from the transmitting station 200. The complete radio signal 206 comprises a relatively large field 208 with data, which may be referred to as the payload of the signal, and a relatively shorter preamble 210. The preamble 210 as such may typically comprise various fields with bits to be used for training, synchronization in time and frequency, channel estimation, indication of Modulation and Coding Scheme, MCS, and so forth which is known in the art. In this example, the preamble 210 comprises a so-called "SIG" field 212 which in turn may contain a so-called PHY header used for physical layer signaling. The above-described at least one power limitation bit is shown located in the SIG field 212 where it is denoted 214.

The at least one power limitation bit discussed in this disclosure may be comprised of a single bit which can be set to either 1 or 0 depending on the targeted station's power limitation status, or it may be comprised of two or more bits which can be set to a first value indicating that the targeted station 202 is power limited or a second value indicating that the targeted station 202 is non-power limited, as mentioned above. It should be noted that any values may be the used as the first and second values of which the values 1 and 0 are optional examples. Naturally, the first and second values are different values and not the same.

The radio signal 206 is further shown to comprise a checksum field 216 right at the end of the signal, which is customary to enable correct decoding of the radio signal, such that the checksum field 216 is thus transmitted last of all after the preamble 210 and the data 208 have been transmitted. Thanks to the at least one power limitation bit being located in the preamble 210, it is not necessary for the receiving station 204 to receive and decode the entire radio signal, including the checksum field 216, just to find that the radio signal is not targeted to that station. It was mentioned above that the checksum is typically taken over the entire radio signal, e.g. a data packet, which must thus be decoded in its entirety to confirm that the signal has been received correctly according to the checksum.

An example of how the solution may be employed in terms of actions will now be described with reference to the flow chart in FIG. 3 which illustrates a procedure performed by a transmitting station in a wireless communication network for enabling power saving in one or more receiving stations when the transmitting station transmits a radio signal to a targeted station. This procedure can be employed to accomplish the functionality described above. Further, the procedure may be applied in the example described above with reference to FIGS. 2 and 2a.

A first action 300 illustrates that the transmitting station may first obtain data to be transmitted to a targeted station, e.g. from an application or the like currently running in the transmitting station or from another node in the network. In a next action 302, the transmitting station estimates a power limitation status of the targeted station. In this context, the term "power limitation status" refers basically to whether the targeted station is power limited or non-power limited depending on its power source that is used for operating it. Typically, when the power source is a battery with limited lifetime the targeted station is deemed to be power limited, while when the power source is a virtually unlimited mains power supply or similar, also known as AC power source, the targeted station is deemed to be non-power limited. The transmitting station may for example estimate the power limitation status depending on what type or category the targeted station is.

In some possible embodiments, the power limitation status of the targeted station can be estimated to be non-power limited when identified as being any of: an Access Point, a base station and a relay station. These types of communication node are commonly comprised in a network infrastructure, as opposed to wireless devices or the like, and typically use a mains power supply or similar as power source. In other possible embodiments, the power limitation status of the targeted station can be estimated to be power limited when identified as being any of: a non-Access Point, an Energy Limited station, sometimes referred to as "EL STA", and a sensor station. These types of communication equipment are commonly wireless devices that use a small battery as power source. In another possible embodiment, the power limitation status of the targeted station may be received in a beacon transmitted from the targeted station or in signalling from the targeted station during an association or handshake phase. For example, a beacon is typically transmitted from access points and base stations of a network, while an association or handshake phase is typically employed to establish a connection between a wireless device and the network.

In a further action 304, the transmitting station sets at least one power limitation bit that indicates the estimated power limitation status of the targeted station. In some possible embodiments, which have also been discussed above, the at least one power limitation bit may be set to a first value, e.g. 1, when the estimated power limitation status of the targeted station is power limited and to another second value, e.g. 0, when the estimated power limitation status of the targeted station is non-power limited.

However, in some cases the power limitation status of the targeted station may be unknown or doubtful, e.g. when the status is not possible to determine by the transmitting station. In that case it may be necessary for the receiving station(s) to receive and decode the complete radio signal to see if it is directed to that station or not, to be on the safe side. This can be accomplished by setting the power limitation bit so that the receiving station(s) will do so. According to another possible embodiment, the at least one power limitation bit may thus be set to the first value when the estimated power limitation status of the targeted station is unknown. Thereby, the receiving station(s) will receive and decode the complete radio signal based on the power limitation bit. For example, a power limited receiving station will receive and decode the complete radio signal when the power limitation bit has the first value thus indicating a potentially power limited targeted station.

Figure 3:
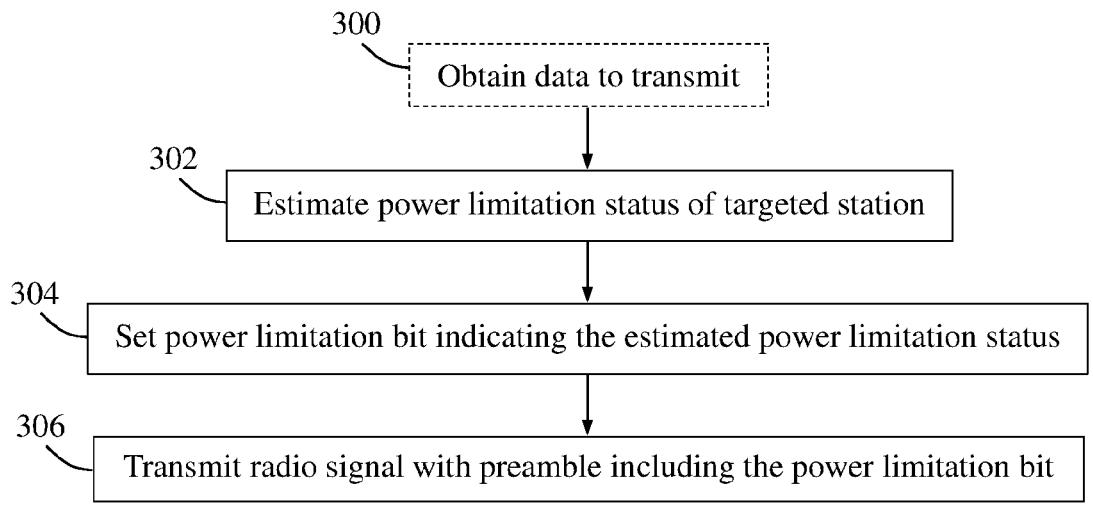
FIG. 3 is a flow chart illustrating a procedure in a transmitting station, according to further possible embodiments.

A final action 306 in FIG. 3 illustrates that the transmitting station transmits the radio signal with a preamble including the at least one power limitation bit. Thereby, any receiving station that receives the preamble is enabled to determine whether to receive and decode the complete radio signal or not based on the at least one power limitation bit. In further possible embodiments, the radio signal may comprise one or more data packets, and the at least one power limitation bit may be located in a SIG field of the preamble, which was described above with reference to FIG. 2a.

Figure 4:
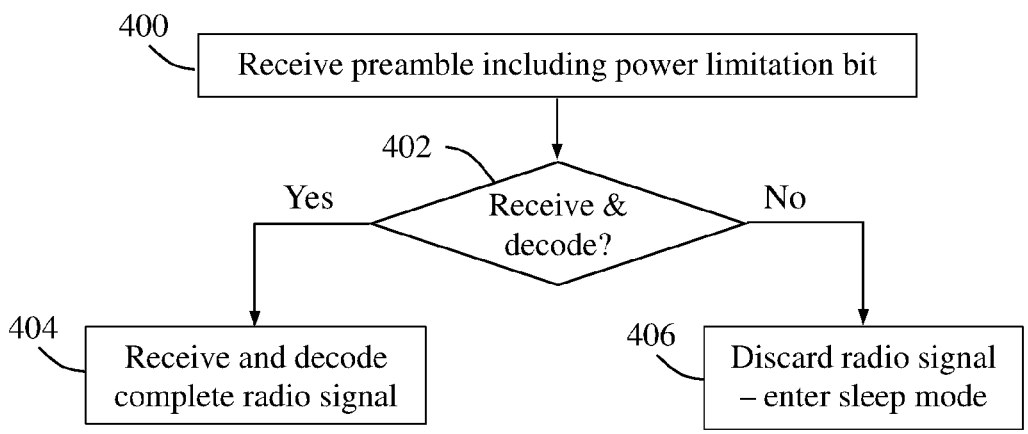
FIG. 4 is a flow chart illustrating a procedure in a receiving station, according to further possible embodiments.

An example of how the receiving station may operate will now be described with reference to the flow chart in FIG. 4 which illustrates a procedure performed by a receiving station when a transmitting station transmits a radio signal to a targeted station. FIG. 4 is thus basically performed after the procedure of FIG. 3 has been executed by the transmitting station, as indicated by a dashed arrow. In a first action 400, the receiving station thus receives a preamble of the radio signal, the preamble including at least one power limitation bit that indicates a power limitation status of the targeted station.

The receiving station then determines, in a next action 402, whether to receive and decode the complete radio signal or not based on the at least one power limitation bit. In this example, the receiving station may determine this based on whether the at least one power limitation bit indicates that the targeted station has the same power limitation status as the receiving station, e.g. when both stations are power limited. In that case the receiving station receives and decodes the complete radio signal in an action 404. If the at least one power limitation bit indicates that the targeted station's power limitation status is different than the receiving station, the receiving station discards the radio signal in an action 406 and may instead enter sleep mode or other power saving operation mode. This may be particularly valuable when the receiving station is itself power limited and the targeted station is non-power limited which means that the radio signal is confidently not directed to that receiving station.

In a possible embodiment, the receiving station may thus decide to receive and decode the complete radio signal when detecting that the at least one power limitation bit has a first value indicating that the power limitation status of the targeted station is power limited. In another possible embodiment, the receiving station may instead decide to discard the radio signal when detecting that the at least one power limitation bit has a second value indicating that the power limitation status of the targeted station is non-power limited. In yet another embodiment, the receiving station may in that case save power by entering sleep mode after detecting the at least one power limitation bit in the preamble of the radio signal.

It was mentioned above that the at least one power limitation bit may be located in a SIG field of the preamble. In the IEEE standard 802.11ah for wireless networking, a so-called "uplink indication bit" is defined in the SIG field located in SHORT and LONG preambles of transmitted data packets. This uplink indication bit can be set by a wireless device, when transmitting a data packet to an access point or base station, to indicate that the transmission is uplink so that any other wireless devices will know that the data packet is not likely of interest for wireless devices which only receive downlink radio signals. Conventionally, this uplink indication bit thus only tells if the data packet is transmitted uplink or not. When the solution in this disclosure is employed, the uplink indication bit may be replaced by a power limitation bit which can thus be used in the manner described herein.

Another example of how the transmitting station may operate in more detail will now be described with reference to the flow chart in FIG. 5 which can be combined with any of the embodiments described above. The transmitting station may thus be configured to operate according to any of the above-described examples and embodiments and as follows.

A first action 500 illustrates that the transmitting station obtains data to be transmitted in a radio signal to a targeted station, thus corresponding to action 300 above. In a next action 502, the transmitting station identifies a type of the targeted station. Some examples of different types of station have been given above which may basically imply the power limitation status of the targeted station. The transmitting station then estimates the power limitation status of the targeted station, in another action 504. It should be noted that sometimes the transmitting station is not able to identify the type of targeted station. In this action the power limitation status can be estimated to be one of: non-power limited, power limited or unknown. The latter case may be estimated when the type of targeted station could not be positively identified in action 502, for whatever reason.

The transmitting station accordingly proceeds to determine whether the targeted station can be regarded as positively non-power limited or not, in an action 506. If not, the power limitation bit is set to a first value, e.g. 1, in an action 508, which implies that the targeted station's estimated power limitation status was either power limited or unknown in action 504, as discussed above. Otherwise, if the targeted station is positively non-power limited according to action 504, the power limitation bit is set to a second value, e.g. 0, in an action 510. In the following action 512, the transmitting station includes the power limitation bit in a preamble of the radio signal and the transmitting station transmits the radio signal with the preamble and the data, as shown in a final action 514. Thereby, if a receiving station is itself power limited, it can receive and decode the entire radio signal if the power limitation bit in the preamble has the first value, e.g. 1, or else discard the radio signal immediately after the preamble to avoid unnecessary power consumption, as explained above.

Figure 6:
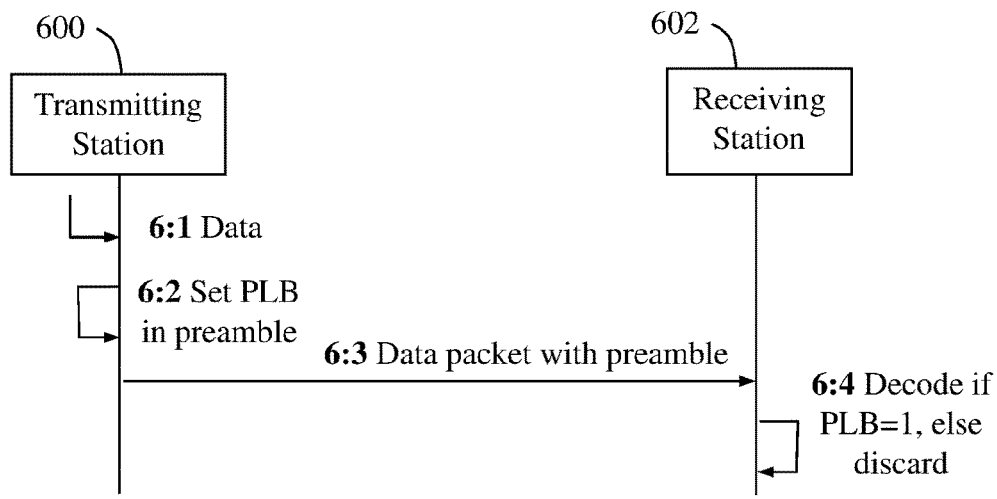
FIG. 6 is a signaling diagram illustrating an example of a procedure when the solution is used, according to further possible embodiments.

FIG. 6 is a signaling diagram illustrating the procedure according to any of the above-described examples. In a first action 6:1, a transmitting station 600 obtains data to be transmitted in a radio signal to a targeted station, not shown here. The transmitting station 600 then sets the power limitation bit "PLB" in a preamble of the radio signal in an action 6:2, and transmits the radio signal in an action 6:3. It has been described above how the power limitation bit can be set depending on the power limitation status of the targeted station 602 which will not be repeated here.

A receiving station 602 receives the preamble of the transmitted radio signal and performs the final shown action 6:4 as follows. Assuming that the receiving station 602 is itself power limited, it receives and decodes the complete radio signal if the power limitation bit in the preamble is 1 implying that the targeted station's power limitation status is power limited or unknown, or else discards the radio signal immediately after the preamble if the power limitation bit is 0 implying that the targeted station's power limitation status is non-power limited.

The block diagram in FIG. 7 will now be described which illustrates a non-limiting example of how a transmitting station 700 and a receiving station 702, respectively, may be structured to bring about the above-described solution and embodiments thereof. In this figure, the transmitting station 700 and the receiving station 702 may be configured to operate according to any of the examples and embodiments of employing the solution as described above, where appropriate, and as follows. Each of the transmitting station 700 and the receiving station 702 is shown to comprise a processor "P", a memory "M" and a communication circuit "C" with suitable equipment for transmitting and receiving radio signals in the manner described herein.

The communication circuit C in each of the transmitting station 700 and the receiving station 702 thus comprises equipment configured for communication over a radio interface using a suitable protocol for radio communication depending on the implementation. The solution is however not limited to any specific types of messages or protocols.

Figure 5:
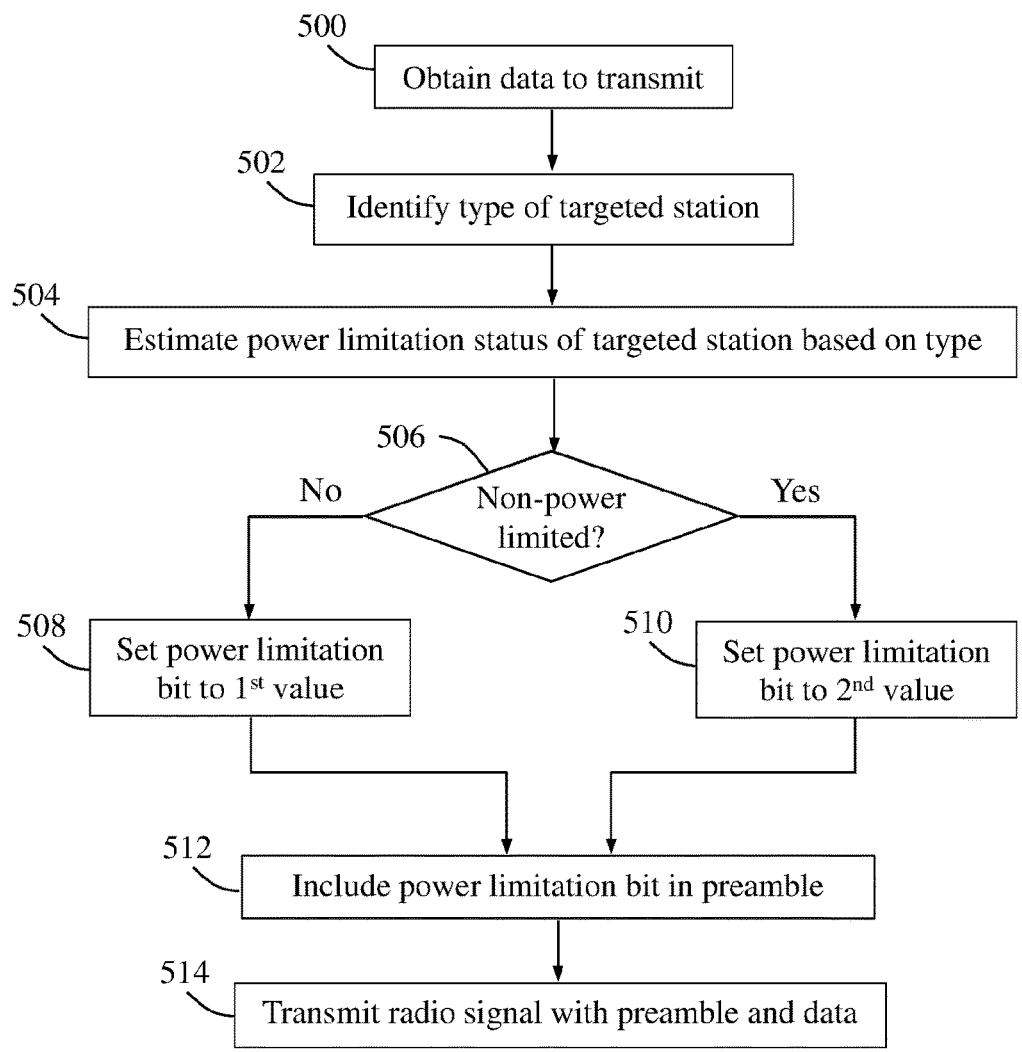
FIG. 5 is a flow chart illustrating a more detailed example of a procedure in a transmitting station, according to further possible embodiments.

The transmitting station 700 comprises means configured or arranged to perform at least some of the actions of the flow charts in FIG. 3 and FIG. 5 in the manner described above. Further, the receiving station 702 comprises means configured or arranged to perform the actions of the flow chart in FIG. 4 in the manner described above. The actions of FIGS. 3-5 may be performed by means of functional modules in the respective processor P in the transmitting station 700 and the receiving station 702.

The transmitting station 700 is arranged to enable power saving in one or more receiving stations 702 when the transmitting station 700 transmits a radio signal to a targeted station, not shown. The transmitting station 700 thus comprises the processor P and the memory M, said memory comprising instructions executable by said processor, whereby the transmitting station 700 is operative as follows.

The transmitting station 700 is operative to estimate a power limitation status of the targeted station. This estimating operation may be performed by an estimating module 700a in the transmitting station 700, e.g. in the manner described for action 302 above. The transmitting station 700 is also operative to set at least one power limitation bit that indicates the estimated power limitation status of the targeted station. This setting operation may be performed by an setting module 700b in the transmitting station 700, e.g. in the manner described for action 304 above.

The transmitting station 700 is further operative to transmit the radio signal with a preamble including the at least one power limitation bit, thereby enabling any receiving station that receives said preamble to determine whether to receive and decode the complete radio signal or not based on the at least one power limitation bit. This transmitting operation may be performed by a transmitting module 700c in the transmitting station 700, e.g. in the manner described for action 306 above.

The receiving station 702 comprises a processor P and a memory M, said memory comprising instructions executable by said processor whereby the receiving station 702 is operative as follows.

The receiving station 702 is operative to receive a preamble of a radio signal transmitted by a transmitting station 700 to a targeted station, the preamble including at least one power limitation bit that indicates a power limitation status of the targeted station. This receiving operation may be performed by a receiving module 702a in the receiving station 702, e.g. in the manner described for action 400 above. The receiving station 702 is also operative to determine whether to receive and decode the complete radio signal or not based on the at least one power limitation bit. This determining operation may be performed by a determining module 702b in the receiving station 702, e.g. in the manner described for action 402 above.

Figure 7:
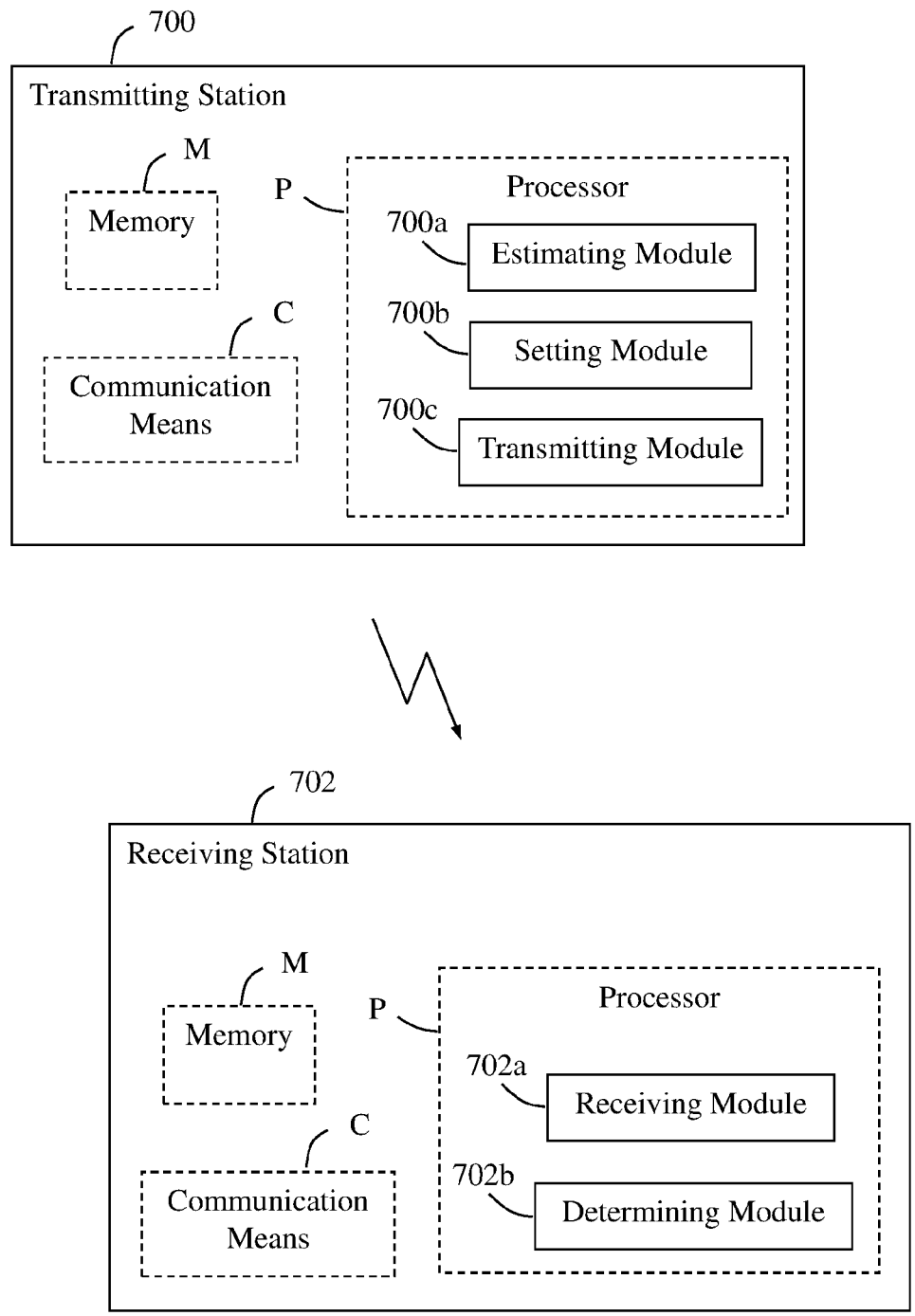
FIG. 7 is a block diagram illustrating a transmitting station and a receiving station in more detail, according to further possible embodiments.

It should be noted that FIG. 7 illustrates various functional modules in the transmitting station 700 and the receiving station 702, respectively, and the skilled person is able to implement these functional modules in practice using suitable software and hardware. Thus, the solution is generally not limited to the shown structures of the transmitting station 700 and the receiving station 702, and the functional modules 700a-c and 702a-b therein may be configured to operate according to any of the features and embodiments described in this disclosure, where appropriate.

The functional modules 700a-c and 702a-b described above may be implemented in the transmitting station 700 and the receiving station 702, respectively, by means of program modules of a respective computer program comprising code means which, when run by the processor P causes the transmitting station 700 and the receiving station 702 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the transmitting station 700 and the receiving station 702 in the form of a memory having a computer readable medium and being connected to the processor P. The computer program product or memory M in each of the transmitting station 700 and the receiving station 702 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective transmitting station 700 and receiving station 702.

The solution described herein may be implemented in each of the transmitting station 700 and the receiving station 702 by a computer program comprising instructions which, when executed on at least one processor, cause the at least one processor to carry out the actions according to any of the above embodiments, where appropriate. The solution may also be implemented at each of the transmitting station 700 and the receiving station 702 in a carrier containing the above computer program, wherein the carrier is one of an electronic signal, optical signal, radio signal, or computer readable storage medium.

Figure 8:
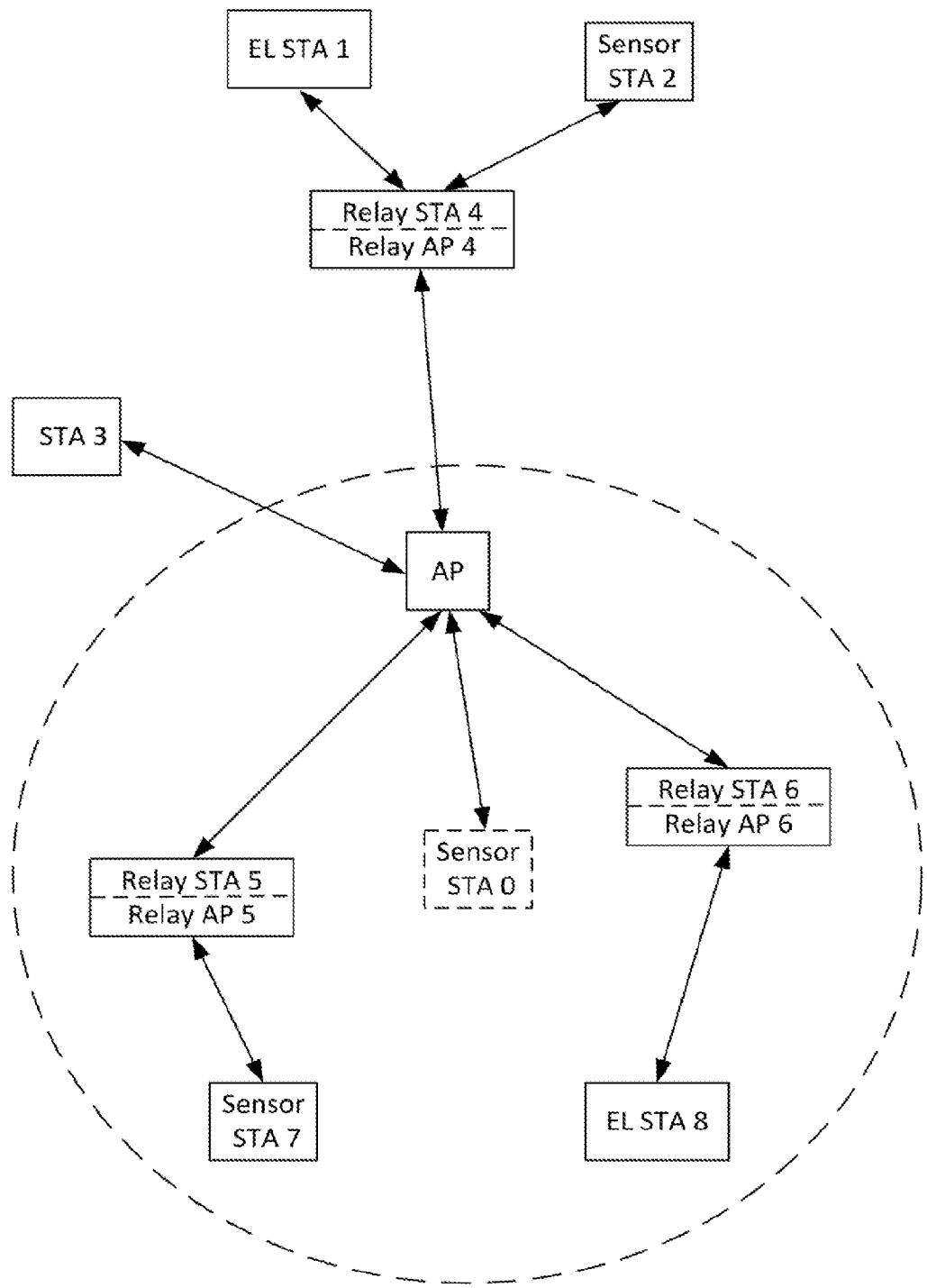
FIG. 8 is a communication scenario illustrating some examples of how the solution may be employed in view of a receiving station when various radio signals are transmitted, according to further possible embodiments.

An illustrative but non-limiting example of a wireless communication network using the standard 802.11ah will now be described with reference to FIG. 8. The shown network comprises the following types of nodes: "STA" denotes a wireless device which is assumed to be power limited, "AP" denotes an access point which is assumed to be non-power limited, and "Relay" denotes a relay node which is also assumed to be non-power limited. Each Relay has an interface that acts as AP towards any STA and another interface that acts as STA towards any AP. It is assumed that all nodes in the network utilize a 1 MHz channel bandwidth, and that all transmitted packets comprise the above-mentioned S1G_1M preamble.

The sensor STA 0 will now be considered, marked with a dashed square. STA 0 can hear transmissions from any nodes located within the dashed circle. In this example, STA 0 is expecting a data packet from the AP, while a current packet being received by STA 0 is not the expected packet from the AP but arises from any of the following transmissions:

1. Transmission from AP to STA 3 (downlink)
2. Transmission from AP to relay STA 4 (downlink)
3. Transmission from AP to relay STA 5 (downlink)
4. Transmission from AP to relay STA 6 (downlink)
5. Transmission from relay STA 5 to AP (uplink)
6. Transmission from relay STA 6 to AP (uplink)
7. Transmission from STA 7 to relay AP 5 (uplink)
8. Transmission from STA 8 to relay AP 6 (uplink)
9. Transmission from relay AP 5 to STA 7 (downlink)
10. Transmission from relay AP 6 to STA 8 (downlink)

If the current version of the standard is used, STA 0 must receive and decode the complete packet which consumes power to no avail whenever the received packet arises from any one of the cases 1-10 above. Also, packets transmitted from the AP to a relay and packets transmitted from a relay to the AP may sometimes be very extensive since the data to/from several STA's can be aggregated into a single packet when conveyed over a relay. Thus, in cases 2-6 above the packets can be quite lengthy.

It is possible to improve energy efficiency for STA 0 by introducing the above-described uplink indication bit in the S1G_1M PHY header. As explained above, the uplink bit may be present in the SHORT and LONG PHY headers, and it could also be included in the S1G_1M PHY header. In this case, STA 0 would receive and decode the complete packet in cases 1, 2, 3, 4, 9, 10 of downlink transmission where the uplink indication bit is accordingly not set, while it can discard the packet after reading the uplink indication bit being set in cases 5, 6, 7, 8 of uplink transmission.

The above use of the uplink indication bit would offer improved energy efficiency compared to the current version of the standard, as decoding only the PHY header consumes less energy than receiving and decoding the complete packet. But STA 0 must still receive and decode the complete packet particularly in cases 2, 3, 4 which packet may be comprised of several aggregated packets and therefore very lengthy.

In case all the transmitting stations apply the power limitation bit according to the solution described herein, STA 0 would be able to save considerable power as follows. It is assumed that the AP knows that STA 3 is non-power limited, and that all the STA's know that both the AP and all relays, whether relay STA or relay AP, are non-power limited. Consequently, the power limitation bit will be set to indicate a non-power limited targeted station in cases 1, 2, 3, 4, 5, 6, 7, 8, while the power limitation bit will be set to indicate a power limited targeted station only in cases 9, 10. STA 0 would therefore receive and decode the complete packet in cases 9, 10 and decode the PHY header and discard the packet in cases 1, 2, 3, 4, 5, 6, 7, 8.

Thus the proposed solution is much more advantageous from the energy savings perspective than either the current standard or a solution using the uplink indication bit. In particular, STA 0 never needs to receive and decode any lengthy aggregated packets exchanged between AP and relays. Also, since the AP knows whether a STA is a sensor or EL STA, these types of battery powered devices don't need to decode packets directed to non-power limited STA's such as STA 3 in this example.

While the solution has been described with reference to specific exemplifying embodiments, the description is generally only intended to illustrate the inventive concept and should not be taken as limiting the scope of the solution. For example, the terms "transmitting station", "targeted station", "receiving station", "power limitation status", "radio signal", "preamble", "power limited" and "non-power limited" have been used throughout this disclosure, although any other corresponding entities, functions, and/or parameters could also be used having the features and characteristics described here. The solution is defined by the appended claims.

The invention claimed is:

1. A method performed by a transmitting station for enabling power saving in one or more receiving stations when the transmitting station transmits a radio signal to a targeted station, the method comprising:
   determining a power limitation status of the targeted station;
   setting a set of one or more power limitation bits that indicate the determined power limitation status of the targeted station; and
   transmitting the radio signal with a preamble including the set of power limitation bits, thereby enabling any receiving station that receives said preamble to determine whether to receive and decode the complete radio signal or not based on the set of power limitation bits, wherein
   the set of power limitation bits is set to a first value when the determined power limitation status of the targeted station is power limited,
   the set of power limitation bits is set to a second value when the determined power limitation status of the targeted station is non-power limited, and
   the set of power limitation bits is set to the first value when the determined power limitation status of the targeted station is unknown.

2. The method of claim 1, further comprising the transmitting station receiving power limitation information transmitted by the targeted station.

3. The method of claim 2, wherein determining the power limitation status of the targeted station comprises determining the power limitation status of the targeted station based on the received power limitation information transmitted by the targeted station.

4. A transmitting station arranged to enable power saving in one or more receiving stations when the transmitting station transmits a radio signal to a targeted station, the transmitting station comprising:
   a processor; and
   a memory, said memory comprising instructions executable by said processor, wherein the transmitting station is configured to:
   determine a power limitation status of the targeted station based on power limitation information transmitted by the targeted station,
   set a set of one or more power limitation bits, wherein the set of power limitation bits indicate the determined power limitation status of the targeted station, and
   transmit the radio signal with a preamble including the set of power limitation bits, thereby enabling any receiving station that receives said preamble to determine whether to receive and decode the complete radio signal or not based on the set of power limitation bits.

5. The transmitting station of claim 4, wherein the transmitting station is configured to set the set of power limitation bits to a first value when the determined power limitation status of the targeted station is power limited and to a second value when the determined power limitation status of the targeted station is non-power limited.

6. The transmitting station of claim 5, wherein the transmitting station is configured to set the set of power limitation bits to the first value when the determined power limitation status of the targeted station is unknown.

7. The transmitting station of claim 4, wherein the transmitting station is configured to determine the power limitation status of the targeted station to be non-power limited when identified as being any of: an Access Point, a base station, and a relay station.

8. The transmitting station of claim 4, wherein the power limitation information is contained in a beacon transmitted from the targeted station or in signalling from the targeted station during an association or handshake phase.

9. The transmitting station of claim 4, wherein the transmitting station is configured to determine the power limitation status of the targeted station to be power limited when identified as being any of: a non-Access Point, an Energy Limited station, and a sensor station.

10. A method performed by a receiving station when a transmitting station transmits a radio signal to a targeted station, the method comprising:

transmitting power limitation information indicating a power limitation status of the receiving station;

receiving a preamble of the radio signal, the preamble including a set of one or more power limitation bits, wherein the set of power limitation bits indicate a power limitation status of the targeted station;

determining whether to receive and decode the complete radio signal or not based on the set of power limitation bits.

11. The method of claim 10, wherein the receiving station receives and decodes the complete radio signal when detecting that the set of power limitation bits has a first value indicating that the power limitation status of the targeted station is power limited.

12. A receiving station comprising:

a processor; and a memory, said memory comprising instructions executable by said processor, wherein the receiving station is operative to:

transmit power limitation information indicating a power limitation status of the receiving station;

receive a preamble of a radio signal transmitted by a transmitting station to a targeted station, the preamble including a set of one or more power limitation bits, wherein the set of power limitation bits indicate a power limitation status of the targeted station, and determine whether to receive and decode the complete radio signal or not based on the set of power limitation bits.

13. The receiving station of claim 12, wherein the receiving station is configured to receive and decode the complete radio signal when detecting that the set of power limitation bits has a first value indicating that the power limitation status of the targeted station is power limited.

14. The receiving station of claim 12, wherein the receiving station is configured to discard the radio signal when detecting that the set of power limitation bits has a second value indicating that the power limitation status of the targeted station is non-power limited.

15. The receiving station of claim 14, wherein the receiving station is configured to save power by entering sleep mode after detecting the set of power limitation bits in the preamble of the radio signal.

* * * * *